United States Patent [19]
Spengler et al.

[11] Patent Number: 4,576,874
[45] Date of Patent: Mar. 18, 1986

[54] SPALLING AND CORROSION RESISTANT CERAMIC COATING FOR LAND AND MARINE COMBUSTION TURBINES

[75] Inventors: Charles J. Spengler, Murrysville Boro; Graham A. Whitlow, Murrysville, both of Pa.

[73] Assignee: Westinghouse Electric Corp., Pittsburgh, Pa.

[21] Appl. No.: 657,421

[22] Filed: Oct. 3, 1984

[51] Int. Cl.$^4$ .................. B21D 39/00; C03C 27/02
[52] U.S. Cl. .................. 428/623; 427/34; 427/423; 428/312.6; 428/319.1; 428/632; 428/633
[58] Field of Search .................. 427/34, 423; 428/623, 428/632, 633, 678, 312.6, 312.8; 415/214; 416/241 R

[56] References Cited
U.S. PATENT DOCUMENTS

| | | | |
|---|---|---|---|
| 4,055,705 | 10/1977 | Stecura et al. | 427/34 |
| 4,088,479 | 5/1978 | Spengler | 420/445 |
| 4,255,495 | 3/1981 | Levise et al. | 428/632 |
| 4,321,310 | 3/1982 | Ulion et al. | 428/623 |
| 4,321,311 | 3/1982 | Strangman | 428/623 |
| 4,328,285 | 5/1982 | Siemers et al. | 427/34 |
| 4,335,190 | 6/1982 | Bill et al. | 427/34 |
| 4,457,948 | 7/1984 | Ruckle et al. | 427/34 |
| 4,481,237 | 11/1984 | Bosshart et al. | 427/34 |
| 4,503,130 | 5/1985 | Bosshart et al. | 428/632 |

OTHER PUBLICATIONS

C. J. Spengler, "Characterization of Corrosion Attack of Superalloys in Combustion Turbines in the Temperature Range 600°-760° C., (1110°-1400° F.)" *Superalloys 1980*, American Society Metals, Metals Park, Oh., 1980, pp. 395-404.
G. A. Whitlow, J. M. Allen and E. A. Crombie, "Combustion Turbine Blade Design Considerations-Prevention of Corrosion Assisted Mechanical Failure," Proceedings of the International Council on Combustion Engines, pp. 559-578, 15th Congress Paris 1983.
C. A. Andersson et al., "Advanced Ceramic Coating Development for Industrial/Utility Gas Turbine Applications," Final Report, Contract No. NASA CR-165619, Aug. 1982, 12 pages.

Primary Examiner—William J. Van Balen
Attorney, Agent, or Firm—R. A. Stoltz

[57] ABSTRACT

This is an improved process for fabricating a turbine blade for use in land based or marine combustion turbines and in particular is a thin ceramic coating applied to at least the portion of the blades which is designed to operate in the 1100°-1500° F. temperature range and especially in turbines designed to be useable with contaminated fuels. The invention utilizes a 1-4 mil thick ceramic coating on at least a portion of the blade designed to operate in the 1100°-1500° F. temperature range and utilizes a process in which the blade is controlled to a temperature of at least 1200° F. during the application of the ceramic coating.

15 Claims, 2 Drawing Figures

& # x20; 
SPALLING AND CORROSION RESISTANT CERAMIC COATING FOR LAND AND MARINE COMBUSTION TURBINES

BACKGROUND AND SUMMARY OF THE INVENTION

The present invention relates to land and marine combustion turbines and in particular a spalling and corrosion resistant ceramic coating.

Marine and land based combustion turbines are subjected to different types of corrosion attack than aircraft turbine blades both because at least portions of their blades operate in a different (lower than aircraft) temperature region (and thus are also subjected to sulfide corrosion and intermediate temperature—1100° to 1500° F.—corrosion) and also are often run with less expensive fuels containing, for example, vanadates which can form highly corrosive molten salt deposits on the blade surfaces.

A variety of coatings have been used commercially in the past to minimize turbine blade corrosion. Such coatings include both diffusion coatings (e.g. platinum aluminide) and surface coatings (e.g. MCrAlY, where the M is a metal such as cobalt or nickel).

In addition, thermal barrier coatings have also been experimentally applied to turbine blade surfaces. Although such coatings also need to resist corrosion, such coatings need to be relatively thick as the primary function of those coatings is to provide insulation such that there is a temperature drop between the gas stream and a cooled metal blade. Such thermal barrier coatings typically have a dense ceramic outer coat, a porous ceramic (and thus insulating) intermediate layer and an MCrAlY bond coat on a nickel base superalloy blade. U.S. Pat. No. 4,255,495 issued to Levine et al. on Mar. 10, 1981 gives examples of thermal barrier coatings. Such coatings typically have a thickness of 20–30 mils to provide a thick enough porous ceramic layer to give a substantial (typically 100°–200° F.) temperature drop. Although this technique holds great promise, considerable difficulties have been incurred in such coatings and cracks in the coatings have resulted in spalling of the ceramic coating and also in trapping corrosive compounds such as molten salts against metal surfaces of the blade.

It has been discovered that a very thin (1–4 mils) coating of ceramic can, if applied hot (at a temperature of at least about 1200° F.) is quite spalling and corrosion resistant. The coating of this invention is not intended to be a thermal barrier coating, and because of its lack of thickness, will not provide a substantial temperature drop. Like the thermal barrier coatings, a bond coat (preferably an MCrAlY) can be first applied on the blade surface. A porous ceramic is applied over the MCrAlY and a dense ceramic is then applied on top. Preferably both the porous ceramic and the dense ceramic are an yttria stabilized zirconia. It should be noted that the porous portion is a transition zone to allow for differences in thermal expansion and, being thin, provides little thermal insulation. It has been found that both keeping the coating very thin and controlling the temperature of the part to which the ceramic coating is applied to at least 1200° F. are critical to producing a long lasting coating.

BRIEF DESCRIPTION OF THE DRAWINGS

The invention can be best understood by references to the following drawings in which.

DESCRIPTION OF THE PREFERRED EMBODIMENTS

Figure 1:
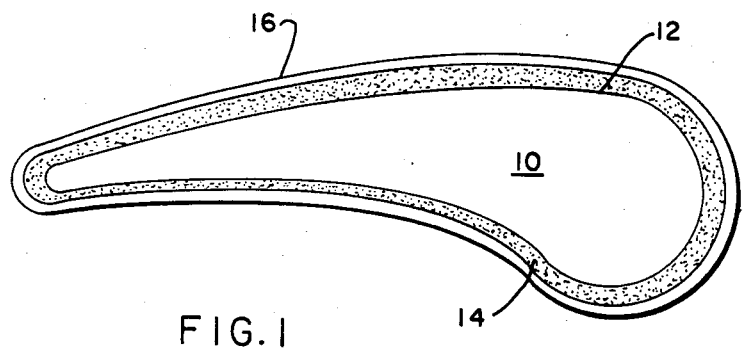
FIG. 1 is a cross section of a blade airfoil portion showing the coating thickness exaggerated of the invention.

FIG. 1 shows a turbine blade 10, in section, having a bond coat 12, a porous expansion layer 14, and a dense overcoat 16 on the airfoil portion of the blade. The root section is not coated. As the lower half of the airfoil section is a critical area, much of which runs in the 1250°–1500° F. temperature range, and because there are coatings which are effective at temperatures over 1500° F. (it is also possible to run blades uncoated at over 1500° F.), it may be desirable to coat only the lower half nearest the root of the airfoil portion with the coating of this invention. As used herein, the term blade refers to parts having airfoil portions whether moving or stationary (and thus includes the stationary parts sometimes called "vanes", which are often of cobalt-based superalloys as compared with the moving parts which are often nickel-based superalloys).

Figure 2:
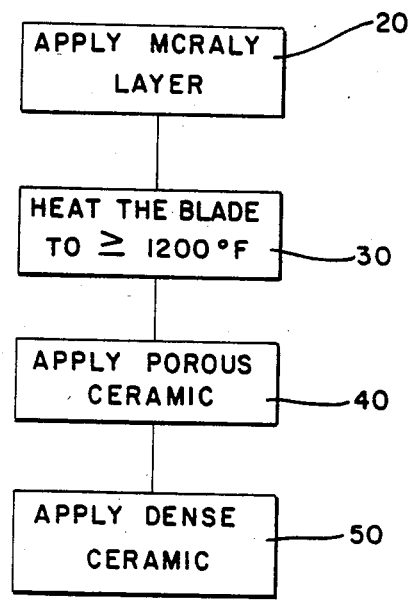
FIG. 2 is a block diagram showing the steps of applying the coating.

FIG. 2 briefly summarizes the application procedure. The first step, 20 applying the MCrAlY layer to the blade. This is followed by 30 heating the blade to about 1200° F., and then 40 applying the porous ceramic, followed by 50 applying the dense ceramic (again with the blade temperature controlled to at least about 1200° F.).

As noted above, the blade airfoils in the temperature region of 1100°–1500° F. present special problems in land based and marine combustion turbines. In this intermediate region the "low temperature hot corrosion mechanism" commonly known as type-II occurs, especially in rotating blades, and because this region coincides with the highly stressed areas the combination of corrosion and stress can lead to degradation of surface sensitive mechanical properties.

The present state of the art is to combat corrosion attack by, for example, coating of the entire airfoil with high chromium or precious metal-containing protective coatings. These are particularly applied by pack diffusion, plasma spray, electron-beam physical vapor deposition or cladding techniques. On the surface of these metal coatings, cobalt-nickel-sulfates form as liquid films with sodium sulfate, which agressively attacks the coatings and eventually the base alloys. In addition, some of these coatings, such as CoCrAlY and platinum aluminide, have poor ductility at around 1300° F., which can cause cracking, allowing the molten sulfate to contact the highly stressed base alloy.

Our invention is specially prepared this ceramic coating for the prevention of hot corrosion degradation of metal at surface temperatures where low melting temperature sulfates, vanadates, and chlorides can be present. Surprisingly, the ceramic barriers which are thin (1–4 mils thick) have been discovered to be less susceptible to cracking even though the porous thermal expansion transition zone is much thinner. The coatings have to be impervious enough to isolate the alkali-alkaline earth chloride-vanadic deposit from any cobalt oxide and nickel oxide compounds which may form at the coating/substrate interface, thus preventing the formation of cobalt and nickel sulfates. In addition, if lower melting temperature sulfate based liquids form due to the presence of lead, zinc, cadmium, manganese, and vanadium, (possibly also copper and phosphorus) the ceramic barrier must screen these from the substrate while in turn being itself resistant to attack from the corrosive liquid.

Preferably, an inner bond layer of the coating is applied by a technique such as low pressure or argon shielded plasma spraying such that the metal bond coating has a well bonded microstructure with minimum porosity. The bond coat should be nominally about 5 mils (125 micrometers) thick. Alternately this coating can be produced by sputtering or ion plating as well as by electron beam physical vapor deposition. This bond coat should have suitable low temperature (less than 1100° F.) ductility, be resistant to attack by molten sulfate deposits and should be an alumina former at temperatures over 1100° F. Such compositions include, for example, NiCoCrAlY's such as nickel-20 wt. %, cobalt-40 wt. %, chromium-5.5 wt. %, aluminum-0.5 wt. %, yttrium, with or without silicon additions. FeCrAlY bond coats can also be used.

The ceramic portions of the coating can be yttria stabilized zirconia. Preferably this is a $ZrO_2$-$8Y_2O_3$ plasma sprayed ceramic which has been shown to be quite resistant to cyclic thermal stresses. The best thermal shock resistance is achieved with thermal coatings containing about 20% by volume porosity. Lower porosity has been shown to shorten thermal stress lifetime. As the barrier effect is compromised if the ceramic coating has porosity connected to the metal surface, and the internal portion of the coating has to have porosity to impart thermal stress resistance, the ceramic portion requires both porous and dense layers. This can be accomplished by controlling the plasma spraying of fine particle ceramics or by applying a single (porous) coating and then laser melting the surface to provide a dense outer layer.

The composition of the ceramic is not limited to the preferred yttria stabilized zirconia, but can also be alumina, $CaO$-$ZrO_2$, $MgO$-$ZrO_2$ or other complex ceramic oxides that have phase stability up to a temperature of at least 1450° F. and also demonstrate chemical stability in molten sodium sulfate-lead oxide-sodium chloride salts.

It has been found that the ceramic coating has to have a minimum of 1 and a maximum of 4 mils thickness. The porous portion should be between ½ mil and 3.5 mils, and the dense portion should be between 0.5 and 1.5 mils.

In the past, plasma spraying of ceramic coatings has been performed on the substrates which are not preheated and, although substrate temperatures may rise during coating, the substrate temperatures have been uncontrolled. In this process, the parts to be coated with ceramics are preheated to above 1200° F. so that at the peak temperatures of subsequent service exposure the ceramics on the lower portions of a blade are in compression or only slight tension due to the mismatches of thermal expansion between the ceramic and base alloy. This minimizes the tendency of the ceramic coating to spall under thermal cycling and service. This thin coating has proven more resistant to spalling than thicker coatings. When applied as taught herein, the strain of the ceramic coating during operation should be less than the elastic limit strain of the porous ceramic (nominally 0.4% strain).

In one experiment, hollow cylinders of superalloys were coated with a bond coat of nickel with 20 wt. % chromium, 10 wt. % aluminum, and about 0.5 wt. % ytrrium, with the thickness of 5 mils. The cylinders were then coated with one zirconia-8 wt. % yttria plasma sprayed ceramic layer One cylinder was coated to a thickness of 4 mils and the second was coated to a thickness of 12 mils (to simulate thermal barrier coatings which are always at least 12 mils thick).

The specimens were fixtured into a specially designed air cooled holder. The ceramic coated specimens, along with superalloy specimens uncoated and coated with low pressure plasma spray and MCrAlY compositions and various diffusion coatings (chrome aluminide, aluminum, and platinum aluminide) were tested in a burner rig in the combustion products of two No. 2 distillate fuels, doped with sea salt, (100 ppm sodium) and doped with sea salt plus lead. Gas temperatures were held to 1900° F. and the metal temperatures ranged between 1100° and 1450° F. Thermal cycles consisted of 55 minutes of heating and 5 minutes of forced air cooling. The specimens were tested for 300 hours (cycles) and evaluated.

The time to initial spalling of the 12 mil thick ceramic coating was 100 hours. The 4 mil thick ceramic coating resisted spalling through to the end of the test (300 hours).

The sulfate based deposits in the spalled areas of the 12 mil thick coating showed visual evidence of reaction with the bond coat. The 4 mil thick coating showed no spalling or reaction with the sulfate-based deposit. The uncoated superalloys and metal-superalloy showed various degrees of type-II corrosion attack. The best bond metal composition was the plasma sprayed nickel with 20% cobalt, 40% chromium, 5.5% aluminum and 0.5% yttrium (which is also the preferred bond coat of this invention, although other bond coats such as nickel, 30 wt. % cobalt, 23 wt. % chromium, 8.5 wt. % aluminum, and 0.5 wt. % yttrium and iron with chromium aluminum and yttrium can also be used).

Preferably the ceramic coating is only on the portion of the blade designed to operate below about 1500° F. This can be achieved by, for example, masking of the area which is not to receive the coating. The coatings as applied by plasma spray typically have rough surfaces in excess of 100 microns RMS. Surfaces are easily contaminated by handling. Foreign substances, if present at surface temperatures may not volatize or burn off thus increasing the chance of premature ceramic barrier layer failure. Such substances are hydrocarbons, lead, zinc, copper and the halogen-group salts. The rough surfaces also catch more impinging particulates thus increasing the rate of deposit build up. This can interfere with heat transfer and the aerodynamics of gas flow. Any polishing of the final ceramic coating should be done carefully (the coating should not be tumbled polished) because of the possibility of the removal of the dense outer coating. If any appreciable final polishing is necessary, the outer coating may have to be resealed to prevent porosity.

Although the thin ceramic coating is significantly less prone to cracking than thicker coatings, the coating still may crack if strains are present in the metal components that exceed the barrier coating effective elastic limits. In practice, the coating should not be applied to areas that operate so hot that the ceramic coating goes into more than slight tension and the strain exceeds the effective elastic limit. The coatings are in compression at temperatures lower than about the application temperature, and therefore satisfactory for all cooler portions of the blade. The substrate temperatures can be hotter than 1200° F. and are limited only by the temperature effects on the base alloy. Generally the coating should be applied only in regions which will operate at less than 200°–300° F. more than the temperature of the substrate when the coatings were applied (thus if the ceramic is applied with a substrate temperature of 1600° F. the coating should be applied only in regions which operate at less than 1900° F., and preferably less than about 1850° F.). If applied close enough to the maximum temperatures, the entire airfoil can be coated.

As noted above, this invention is designed especially for rotating components as these components are subjected to additional stresses, but that this coating can be used for corrosion protection of stationary components as well.

The novel features of this invention are the use of a thin ceramic coating applied in areas which are at a temperature which the coating will remain under compression or only in slight tension to accommodate subsequent strain due to dissimilar thermal expansion on heating, due to the heated substrate during application of the ceramic, and the use of the ceramic screen as a thin corrosion resisting (rather than a thick thermal barrier) coatings.

The invention is not to be construed as limited to the particular forms described herein, since these are to be regarded as illustrative rather than restrictive. The invention is intended to cover all articles and processes which do not depart from the spirit and scope of the invention.

We claim:

1. In the process of fabricating a turbine blade of the type for use in a land-based or marine combustion turbine and having a portion designed to operate in the 1100°–1500° F. temperature range and being designed to be usable with contaminated fuels, the improvement comprising:
   (a) heating said blade to a temperature of at least about 1200° F., and
   (b) applying a 1–4 mil thick ceramic coating to at least the portion of said blade designed to operate in the 1250°–1500° F. temperature range while controlling the blade temperature to at least 1200° F., whereby said coating resists spalling and greatly reduces corrosion of blade.

2. The process of claim 1, wherein an adhesion promoting undercoating is applied prior to said ceramic coating, said undercoating being any alumina former at temperatures greater than about 1100° F.

3. The process of claim 2, wherein said undercoating is of MCrAlY.

4. The process of claim 2, wherein said ceramic is yttria stabilized zirconia.

5. The process of claim 1, wherein said ceramic is applied by plasma spraying.

6. The process of claim 2, wherein said blade is fabricated from a nickel-based superalloy.

7. The blade of claim 1, wherein said ceramic coating is applied at between 300° F. less than the maximum airfoil temperature and the maximum airfoil temperature and is applied on essentially the entire airfoil.

8. In a turbine blade of the type for use in a land-based or marine combustion turbine and having an airfoil of which at least a portion is designed to operate in the 1100°–1500° F. temperature range and being designed to be usable with contaminated fuels, the improvement comprising:
   a 1–4 mil thick ceramic coating on at least the portion of said blade designed to operate in the 1100°–1500° F. temperature range, said ceramic coating having been applied in a manner such that it remains in compression up to a temperature of at least about 1200° F.

9. The blade of claim 8, wherein said ceramic coating is applied at less than 300° F. less than the maximum airfoil operating temperature and is applied on essentially the entire airfoil.

10. The blade of claim 8, wherein an adhesion promoting undercoating is applied prior to said ceramic coating.

11. The blade of claim 10, wherein said undercoating is of MCrAlY.

12. The blade of claim 8, wherein said ceramic is yttria stabilized zirconia.

13. The blade of claim 8, wherein said ceramic is applied by plasma spraying.

14. The blade of claim 8, wherein said blade is fabricated from a nickel-based superalloy.

15. The blade of claim 1, wherein said ceramic coating is applied to only the portion of the airfoil designed to operate at less than 300° F. above the blade temperature at which the coating was applied.

* * * * *